United States Patent [19]

Leigh-Monstevens et al.

[11] Patent Number: 4,918,921
[45] Date of Patent: Apr. 24, 1990

[54] COAXIAL PUSH ROD AND HOLLOW SCREW BALL NUT DRIVE FOR MASTER CYLINDER

[75] Inventors: Keith V. Leigh-Monstevens, Troy; Brian D. Mabee, Warren, both of Mich.

[73] Assignee: Automotive Products plc, Warwickshire, United Kingdom

[21] Appl. No.: 111,294
[22] Filed: Oct. 22, 1987
[51] Int. Cl.⁵ ............................................. B60T 13/74
[52] U.S. Cl. ...................................... 60/545; 60/582; 74/388 R; 310/83
[58] Field of Search ................. 60/538, 545, 582, 550; 74/388 R, 388 PS, 459; 310/93, 191, 209, 83; 180/79.1

[56] References Cited

U.S. PATENT DOCUMENTS

| | | | |
|---|---|---|---|
| Re. 32,222 | 8/1986 | Drutchas | 74/424.8 X |
| 1,131,551 | 3/1915 | Price | 310/209 |
| 2,380,662 | 7/1945 | Means | 74/459 |
| 2,446,393 | 8/1948 | Russell | 74/388 R |
| 2,717,344 | 9/1955 | Jackson | 74/388 R |
| 3,048,976 | 8/1962 | Grigsby et al. | 60/545 |
| 3,048,979 | 8/1962 | Grigsby et al. | 60/545 |
| 3,559,406 | 2/1971 | Gardner | 60/550 X |
| 3,592,072 | 7/1971 | Nilsson | 74/459 |
| 4,019,616 | 4/1977 | Thorne | 74/459 X |
| 4,033,435 | 7/1977 | Bayliss | 188/173 X |
| 4,224,832 | 9/1980 | Prohaska et al. | 74/388 R |
| 4,395,883 | 8/1983 | Melinat | 60/545 |
| 4,531,419 | 7/1985 | Botz et al. | 60/545 X |
| 4,572,314 | 2/1986 | Anguera | 74/388 PS X |
| 4,576,417 | 3/1986 | Dobner | 303/15 |
| 4,607,998 | 8/1986 | Hawkes | 60/545 X |
| 4,709,969 | 12/1987 | Lieess et al. | 60/545 X |
| 4,735,271 | 4/1988 | Shimizu | 180/79.1 |
| 4,756,376 | 7/1988 | Shimizu | 180/79.1 |
| 4,756,391 | 7/1988 | Agarwal et al. | 303/100 X |
| 4,766,970 | 8/1988 | Shimizu | 180/79.1 |
| 4,768,257 | 9/1988 | Brusasco | 318/282 X |
| 4,812,723 | 3/1989 | Shimizu | 60/545 X |

FOREIGN PATENT DOCUMENTS

| | | |
|---|---|---|
| 0124418 | 4/1984 | European Pat. Off. . |
| 0148664 | 11/1984 | European Pat. Off. . |
| 223358 | 9/1986 | European Pat. Off. . |
| 0244556 | 1/1987 | European Pat. Off. . |
| 0235035 | 2/1987 | European Pat. Off. . |
| 0252595 | 5/1987 | European Pat. Off. . |
| 3518715 | 5/1985 | Fed. Rep. of Germany . |
| 3408306 | 9/1985 | Fed. Rep. of Germany . |
| 3430981 | 3/1986 | Fed. Rep. of Germany . |
| 1136072 | 5/1957 | France ................................. 60/545 |
| 2594774 | 8/1987 | France . |
| 58-186755 | 10/1984 | Japan . |
| 516031 | 12/1939 | United Kingdom . |
| 686969 | 2/1953 | United Kingdom . |
| 984396 | 2/1965 | United Kingdom ............. 74/388 R |
| 2071796 | 3/1981 | United Kingdom . |
| 1590584 | 6/1981 | United Kingdom . |
| 2136899 | 11/1983 | United Kingdom . |
| 2125913 | 3/1984 | United Kingdom ................. 60/545 |
| 2141513B | 12/1984 | United Kingdom . |
| 2165914A | 10/1985 | United Kingdom . |
| 2158532 | 11/1985 | United Kingdom ................. 60/550 |

OTHER PUBLICATIONS

*Popular Science*, Mar. 1988 issue, pp. 64–65.
*Le Distributeur Automobile*, Nov. 1987, p. 105.

*Primary Examiner*—Robert E. Garrett
*Assistant Examiner*—George Kapsalas
*Attorney, Agent, or Firm*—Krass and Young

[57] ABSTRACT

An electrically driven master cylinder assembly and various vehicle control systems utilizing the master cylinder assembly. Several forms of master cylinder assemblies are disclosed. In the preferred form, the assembly includes an electric DC motor directly coupled to a master cylinder unit with the central axis of the motor coaxial with the central axis of the bore of the master cylinder, a ball nut is positioned within the housing of the electric motor for rotation with the armature of the motor, and a ball screw is positioned on the axis of the motor and is driven linearly in response to rotation of the armature. The free end of the ball screw engages the piston of the master cylinder so that energization of the motor operates to move the piston of the hydraulic cylinder linearly within the bore of the hydraulic cylinder to discharge fluid from the outlet of the hydraulic cylinder for delivery to a slave cylinder to perform an appropriate vehicle control function such as engagement or disengagement of the vehicle clutch or actuation of the vehicle braking system.

3 Claims, 6 Drawing Sheets

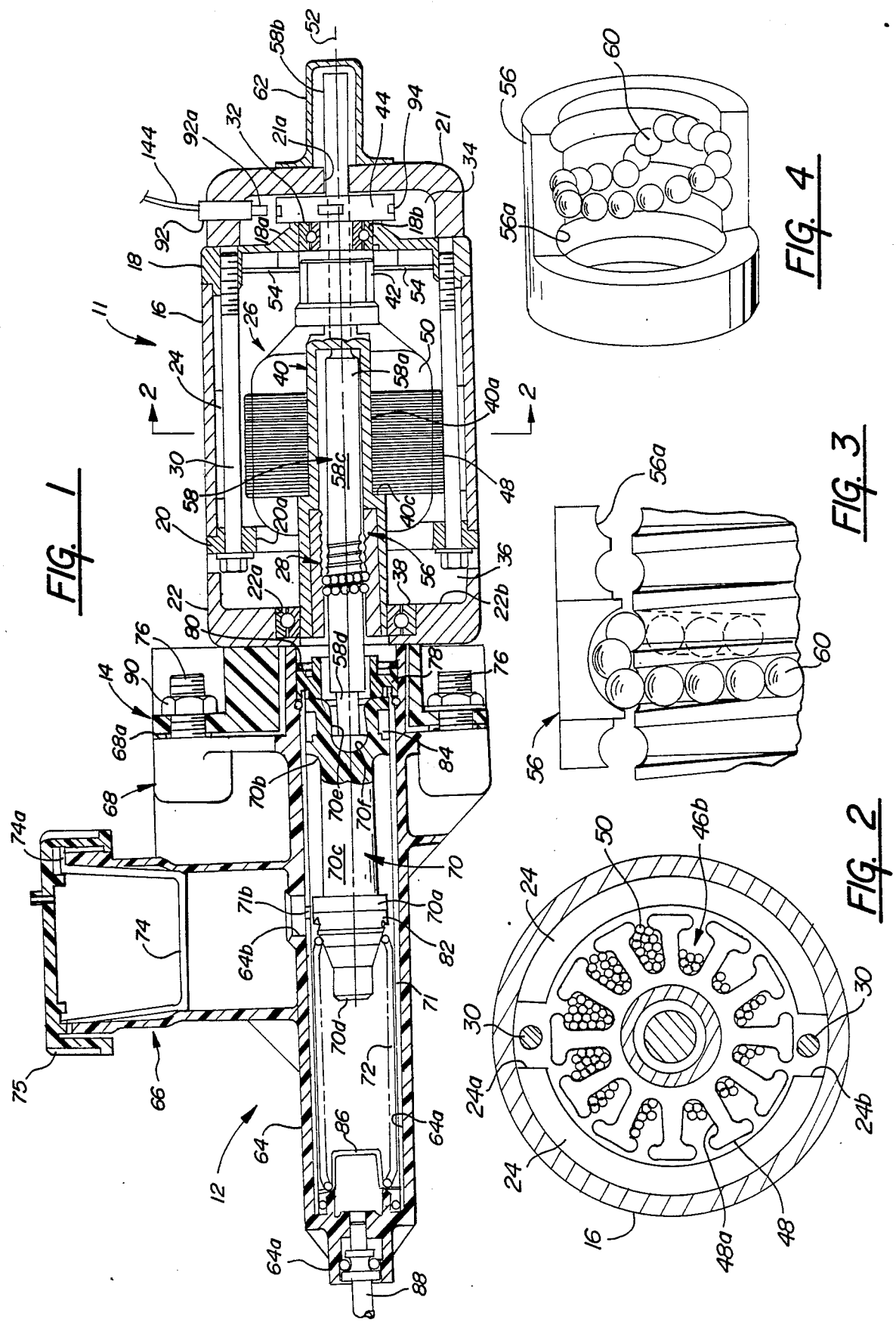

COAXIAL PUSH ROD AND HOLLOW SCREW BALL NUT DRIVE FOR MASTER CYLINDER

BACKGROUND OF THE INVENTION

1. Field of the Invention

This invention relates to master cylinder assemblies and more particularly to a master cylinder assembly in which the master cylinder is actuated by an electric motor forming a part of the master cylinder assembly.

2. Description of the Prior Art

Master cylinders are in wide use in various industries, but particularly in the motor vehicle industry wherein they serve in conjunction with an associated slave cylinder to control various systems of the motor vehicle. For example, the brakes of a motor vehicle are typically actuated by slave cylinders located at the wheels of the vehicle and supplied with pressure fluid from a master cylinder actuated by the brake pedal of the vehicle. As a further example, the clutches of manual transmission vehicles are often engaged and disengaged by a slave cylinder located at the clutch assembly and receiving pressure fluid from a master cylinder actuated by a clutch pedal of the vehicle. In both of the above examples, the master cylinder is directly and manually actuated by the vehicle operator by suitable actuation of the associated control pedal of the vehicle. Whereas manual actuation of a master cylinder is effective to produce the desired resultant action at the associated slave cylinder, there are situations where it would be desirable to provide power operation of the master cylinder as suitably instigated by the vehicle operator. For example, such a power operated master cylinder would be useful in a manual transmission vehicle to engage and disengage the vehicle clutch in response to a suitable signal from the vehicle operator.

SUMMARY OF THE INVENTION

This invention is directed to the provision of an improved master cylinder assembly.

More particularly, this invention is directed to the provision of a power operated master cylinder assembly especially suitable for use in engaging and disengaging the clutch of a manual transmission motor vehicle.

The master cylinder assembly of the invention comprises a motor including a housing; a hydraulic master cylinder including a housing rigid with the motor housing, a cylinder defining an elongated bore, a piston movable linearly and slidably in the bore, inlet means in the cylinder for admitting hydraulic fluid into the bore from a reservoir and an outlet fitting in the cylinder communicating with the bore and operative to convey hydraulic fluid out of the bore for delivery to a slave device in response to linear movement of the piston in the bore; and means operative in response to actuation of the motor to move the piston linearly in the bore. This arrangement provides a simple and compact drive mechanism especially suitable for any situation requiring a power operated master cylinder.

According to a further feature of the invention, the motor is an electric motor and the operative means comprises drive means operative in response to energization of the motor to move the piston linearly in the bore of the master cylinder. This arrangement allows the master cylinder assembly to be readily and effectively powered.

According to a further feature of the invention, the motor further includes an armature, nut means driven by and associated with the armature, and an output shaft having a threaded portion threadably engaging the nut means so that rotation of the armature upon energization of the motor linearly advances the output shaft; and the drive means is operative to move the piston linearly in the bore of the hydraulic cylinder in response to linear advancement of the motor output shaft. This arrangement provides smooth and positive linear movement of the piston within the master cylinder bore in response to energization of the electric motor.

According to a further feature of the invention, the nut means comprises a ball nut; the output shaft threaded portion comprises a ball screw; and the master cylinder assembly further includes bearing balls circulating in the races coactingly formed between the grooves of the ball screw and the grooves of the ball nut and ball guide return means to provide ball recirculation. This arrangement provides a smooth and efficient drive mechanism for moving the piston smoothly and positively in the master cylinder bore in response to energization of the motor.

According to a further feature of the invention, the motor output shaft is mounted for rotation in the motor housing about an axis that is coaxial with the axis of the bore of the master cylinder. This arrangement facilitates a compact and efficient overall assembly package.

According to a further feature of the invention, the motor output shaft is drivingly and coaxially coupled to the piston of the master cylinder. This arrangement provides a direct and efficient means of transferring the linear movement of the motor output shaft to the linear movement of the master cylinder piston.

The invention also provides a novel control system for a motor vehicle. The motor vehicle control system, according to the invention, includes a hydraulic master cylinder assembly including a cylinder defining a bore, a piston mounted for linear movement in the bore, and an outlet fitting communicating with the bore; a hydraulic slave cylinder having an inlet fitting; a hydraulic conduit interconnecting the outlet fitting of the master cylinder and the inlet fitting of the slave cylinder; an electric motor; and means operative in response to energization of the motor to move the piston linearly in the bore of the master cylinder to eject hydraulic fluid from the outlet fitting of the master cylinder for delivery to the slave cylinder. This arrangement provides a compact and efficient control system for controlling the operation of a motor vehicle system or assembly.

According to a further feature of the invention, the slave cylinder constitutes the actuating mechanism for the vehicle clutch assembly.

According to a further feature of the invention, the slave cylinder constitutes the actuating mechanism for the vehicle brake system.

According to a further feature of the invention, the control system further includes control means operative to energize the motor in response to a predetermined movement of a vehicle control member.

According to a further feature of the invention, the control member is the clutch pedal of the vehicle; the slave cylinder comprises the actuating mechanism for the vehicle clutch; and the control means is operative in response to operator depression of the clutch pedal to energize the motor in a sense to move the piston linearly in the bore of the master cylinder in a direction to deliver hydraulic fluid to the slave cylinder to disengage the clutch.

According to a further feature of the invention, the control member is the brake pedal of the vehicle; the slave cylinder comprises the actuating mechanism for the vehicle brake system; and the control means is operative in response to operator depression of the brake pedal to energize the motor in a sense to move the piston linearly in the bore of the master cylinder in a direction to deliver hydraulic fluid to the slave cylinder to actuate the vehicle brake system.

According to a further feature of the invention, the control member is the gearshift lever of the vehicle; the slave cylinder comprises the actuating mechanism for the vehicle clutch assembly; and the control means is operative in response to operator movement of the gearshift lever to energize the motor in a sense to move the piston lineary in the bore of the master cylinder in a direction to deliver hydraulic fluid to the slave cylinder to disengage the clutch assembly.

The invention is also directed to a unique electric motor comprising a housing; an armature mounted for rotation in the housing; a ball nut mounted for rotation with the armature; a ball screw threadably engaging the ball nut; and ball guide return means to provide ball recirculation. This arrangement provides a highly efficient electric motor mechanism for producing linear movement in response to energization of the motor.

According to a further feature of the invention, the armature of the electric motor is annular and the ball nut is positioned concentrically within the armature. This arrangement provides an extremely compact and efficient package.

According to a further feature of the invention, the ball screw is annular and defines a bore extending axially therethrough and the motor further includes a push rod slidably received in the ball screw bore and projecting out of one end of the ball screw bore and one way drive means between the push rod and the ball screw. This arrangement is especially suitable for use in a vehicle braking system since it allows a further override push rod, connected to the brake pedal of the vehicle, to extend into the other end of the ball screw bore to manually move the first push rod in the event of a failure of the motor to move the push rod in response to operator depression of the brake pedal.

BRIEF DESCRIPTION OF THE DRAWINGS

FIG. 1 is a cross-sectional view of the master cylinder assembly of the invention;

FIG. 2 is a cross-sectional view taken on line 2—2 of FIG. 1;

FIGS. 3 and 4 are detailed views showing a ball screw drive mechanism employed in the invention master cylinder assembly;

DETAILED DESCRIPTION OF THE PREFERRED EMBODIMENTS

Figure 5:
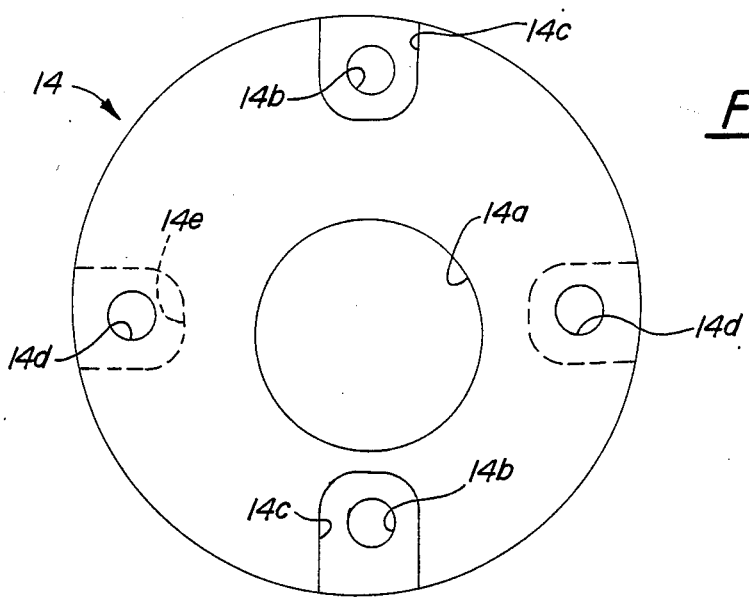
FIG. 5 is a view of an adapter plate employed in the invention master cylinder assembly.

The master cylinder assembly 10 seen in FIGS. 1-5, broadly considered, includes, an electric motor 11 and a master cylinder 12 interconnected by an adapter plate 14.

Motor 11 is of the direct current permanent magnet design and includes an annular main body housing 16, a rearward end cap 18, a forward end cap 20, an auxiliary rearward end cap 21, an auxiliary forward end cap 22, a pair of permanent magnets 24, an armature assembly 26, and a ball screw assembly 28.

Main body annular housing 16 is formed of a suitable ferrous material and is clamped between end caps 18 and 20 by through blots 30 passing through apertures in end cap 20 for threaded engagement with tapped bores in end cap 18 so as to clamp main body housing 16 between end caps 18 and 20. End cap 20 is annular to define a central opening 20a and end cap 18 includes a central hub portion 18a defining a central aperture 18b receiving a ball bearing 32. Auxiliary rearward end cap 21 is cup-shaped and is rigidly secured to the rear face of end cap 18 by suitable fastener members (not shown) to define a cavity 34 between end cap 18 and auxiliary end cap 21. Auxiliary end cap 21 further includes a central aperture 21a of generally circular cross section with a flatted side. Auxiliary end cap 22 is cup-shaped and is suitably rigidly secured to end cap 20 by fastener means (not shown) to define a chamber 36 between auxiliary end cap 22 and end cap 20. Auxiliary end cap 22 further includes a central aperture 22a receiving a ball bearing 38.

As best seen in FIG. 2, permanent magnets 24 are arcuate and are positioned on the interior circumferential surface of housing 16 with gaps 24a and 24b therebetween for passage of bolts 30.

Armature assembly 26 includes an armature 40, a commutator 42, a position sensor 44, a journal shaft portion 46, laminations 48, and windings 50.

Armature 40 includes a tubular main body portion 40a, and an enlarged diameter tubular forward end portion 40b interconnected to main body portion 40a by annular shoulder 40c.

Commutator 42 is of known form and is rigidly secured to the rear end of armature main body portion 40a.

Position sensor 44 is of disk configuration, is positioned within cavity 34, and is rigidly interconnected to commutator 42 by armature journal portion 46. Enlarged armature tubular end portion 40b is received in bearing 38 and armature journal shaft portion 46 is received in bearing 32 so as to mount armature 40 for rotation about central lengthwise motor axis 52. Laminations 48 are secured in face to face relation on armature main body portion 40a and include spoke portions 48a defining gaps 48b therebetween. Windings 50 are wound in known manner around laminations 48 and through gaps 48b and are interconnected to commutator 42 in known manner. Commutator 42 in turn coacts with brushes 54 carried by end cap 18. Brushes 54 provide electrical power to the commutator and thereby to the motor in known manner so that the armature assembly is caused to rotate about central axis 52.

Ball screw assembly 28 includes a ball nut 56 and a ball screw 58.

Ball nut 56 is fixedly mounted in enlarged armature tubular forward end portion 40b and includes, in known manner, a helical precision ground ball groove 56a.

Ball screw 58 includes a main body portion 58a positioned within armature tubular main body portion 40a, a rearward extension portion 58b, a ball groove portion 58c, and a forward input rod portion 58d. Groove portion 58c coacts with grooves 56a of ball nut 56 to define ball races, and bearing balls 60 circulate in known manner in the races to provide linear movement of ball screw 58 in response to rotation of armature assembly 26. Ball screw assembly 28 may be of any known type but preferably is of the internal ball return type wherein, after each turn, the balls are fed back to the preceding turn by a floating liner situated inside the nut. Extension portion 58b of the ball screw passes slidably through aligned bores in commutator 42, armature shaft journal portion 46, and position sensor 44 and through central aperture 21a of auxiliary end cap 21 to position the extreme end of the extension portion outside of auxiliary end cap 21 and within a protective cup-shaped cap 62 suitably secured to auxiliary end cap 21. Shaft extension 58b includes a flatted side for coaction with the flatted side of aperture 21a so as to preclude rotation of ball screw 58 upon rotation of armature assembly 26.

Master cylinder 12 includes a main body member 64, a reservoir 66, a flange 68, a piston 70, a sleeve 71, and a return spring 72.

Main body member 64, reservoir 66 and flange 68 are formed as a single piece integrally molded plastic member. A diaphragm 74, formed of a fluid impervious material such as ethylene propylene, is positioned within reservoir 66 and a reservoir cap 75 closes the open upper end of the reservoir and clamps the upper annular flange 74a of diaphragm 74 to the upper annular edge of the reservoir. Threaded metal studs 76 extend axially rearwardly from flange 68 in circumferentially spaced relation. Main body member 64 defines an elongated axial bore 64a and sleeve 71 is positioned in bore 64a to define an elongated cylindrical bore 71a. Sleeve 71 is metallic, extends the full length of main body bore 64a, and is maintained in position within bore 64a by an annular end cap 78 positioned in the open rearward end of bore 64a. End cap 78 is retained against axial displacement from bore 64a by a spring snap clip 80.

Piston 70 is formed of a suitable plastic material and is slidably received in sleeve bore 71a. Piston 70 includes a forward land portion 70a, a rearward land portion 70b, a spool portion 70c, and a nose portion 70d extending forwardly from forward land portion 70a. Seals 82 and 84 are respectively provided on piston land portions 70a and 70b.

One end of return spring 72 is positioned over piston nose portion 70d and the other end of spring 72 is positioned over a clip 86 positioned at the forward, discharge end of the master cylinder. Main body member 64 further defines an outlet fitting 64a at the forward, discharge end of the master cylinder for receipt of a suitable hose coupling seen fragmentarily at 88. Main body member 64 further defines an inlet bore 64b providing fluid communication between reservoir 66 and bore 64a and a further bore 71b is defined in sleeve 71 for coaction with bore 64b to allow compensating flow of hydraulic fluid between the reservoir and the bore 71a in response to reciprocal movement of piston 70 within bore 71a.

Adapter plate 14 is preferably formed of a suitable metallic material and includes a generally central aperture 14a sized to loosely receive the rearward portion 64c of main body 64 projecting from the front face 68a of flange 68. Adapter plate 14 further includes apertures 14b for passage of threaded studs 76 and cutouts 14c to accommodate nuts 90 threaded onto studs 76. Adapter plate 14 further includes apertures 14d and cutouts 14e for passage of threaded bolts (not shown) for coaction with threaded bores (not shown) provided at circumferentially spaced locations in the end wall 22b of motor auxiliary forward end cap 22.

To assemble the invention master cylinder assembly, adapter plate 14 is secured to motor 11 by passage of bolts through apertures 14d for threaded engagement with the threaded bores in end cap end wall 22b whereafter adapter plate apertures 14b are passed over studs 76 with ball screw input rod portion 58d passing centrally and forwardly through end cap 78 and through a central bore 70e in rearward piston land portion 70b for seating engagement in a concave socket 70f defined at the forward, blind end of bore 70e. Nuts 90 are then tightened onto stud 76 to provide the final master cylinder assembly. In the final assembly, the central axis 52 of motor 11 is coaxial with the central axis of bore 71a of master cylinder 12 so that axis 52 extends totally and centrally through the motor and master cylinder assembly.

In operation, when electricity is provided in known manner to brushes 54, armature assembly 26 is caused to rotate about central axis 52 with the result that ball screw 58 advances linearly along axis 52 with the direction of linear movement depending on the direction of rotation of armature assembly 26. For example, to move piston 70 to the left as viewed in FIG. 1 in a direction to discharge pressure fluid from outlet fitting 64a, motor 11 is energized in a sense to rotate armature assembly 26 in a direction to advance ball screw 58 to the left as seen in FIG. 1.

Conversely, when it is desired to allow piston 70 to be retracted under the force of return spring 72, the motor is energized in an opposite sense to rotate armature assembly 26 in an opposite sense and move ball screw 58 to the right as viewed in FIG. 1. Note that ball screw rearward extension 58b moves within end cap 62 between its solid line and dotted line positions in response to linear movement of the ball screw between its extreme positions. The linear position of the ball screw, and thereby the linear position of piston 70, is continuously sensed by a Hall Effect proximity sensor 92 positioned in auxiliary rearward end cap 21 and including a probe 92a for coaction with a series of permanent magnet segments 94 embedded in position sensor 44 at circumferentially spaced locations thereabout. It will be understood that Hall Effect sensor 92 detects the passage of each successive magnetic segment 94 as armature assembly 26a is rotated and transmits a signal upon each such passage to a suitable counter device so that the linear position of the ball screw and the master cylinder piston are precisely known at all times by the instantaneous reading of the counter device.

Figure 6:
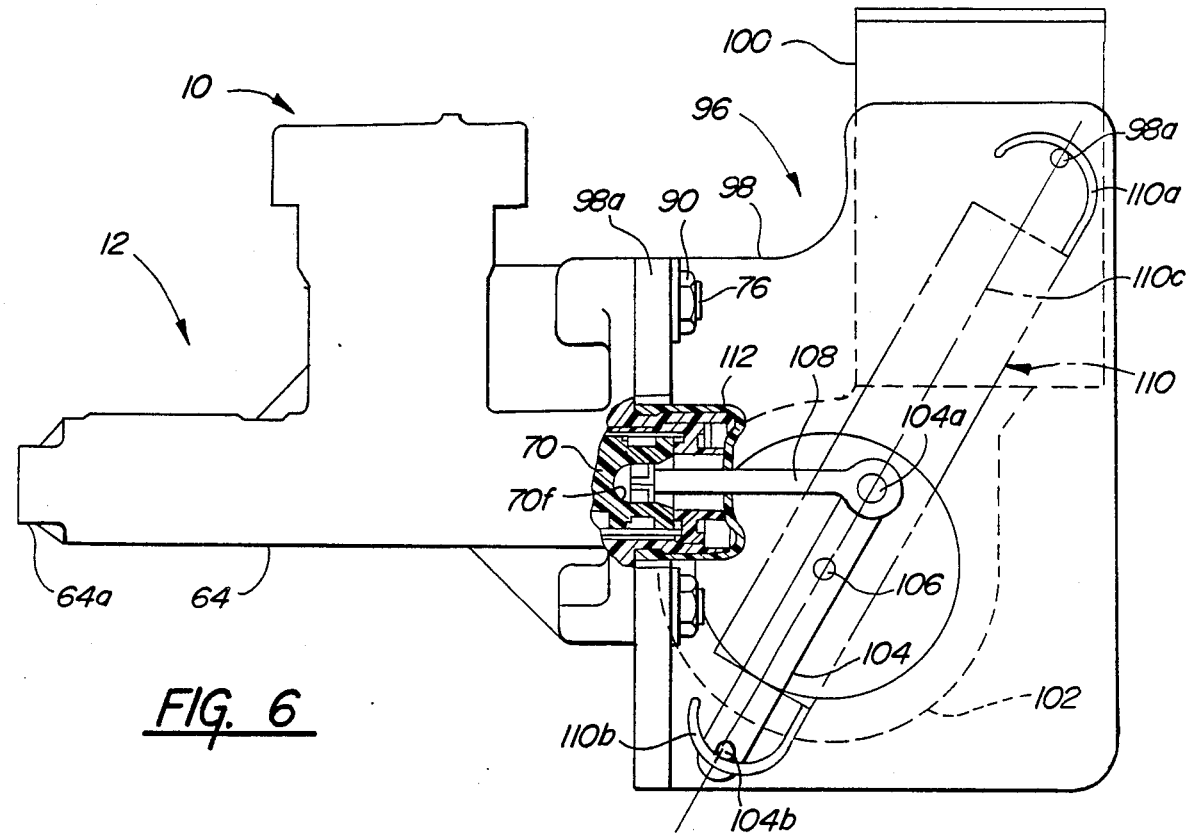
FIG. 6 is a view of a modified version of the invention master cylinder assembly.

A modified form of the invention master cylinder assembly 10 is seen in FIG. 6. In the form of FIG. 6, the piston 70 of the hydraulic master cylinder 12 is moved linearly within the bore of the master cylinder by an electric motor assembly seen generally at 96.

Electric motor assembly 96 includes a frame member 98; an electric DC gear motor 100; a gear reduction unit 102 driven from the output shaft of gear motor 100 in known manner; a crank arm 104 secured to the output shaft 106 of gear reduction unit 102; a push rod 108 secured at one end to the upper end 104a of crank arm 104 and received at its free end in the concave socket 70b of piston 70; and an overcenter coil spring 110 engaged at one end 110a over a pin 98a carried by frame member 98 and engaged at its other end 110b over a pin 104b provided at the lower end of crank arm 104. Spring 110 is positioned such that its line of action 110c passes through the center of the connection 104a between crank arm 104 and push rod 108 with the piston in its retracted or inactive position of FIG. 6 so that, as the piston is moved linearly to the left in response to energization of motor 100, the center 104a moves to the left of the line of action 110c so that the spring, having moved over center, may contribute to the force required to move the push rod and thereby the piston 70 in a linear manner, thereby reducing the power required of motor 100 and allowing the use of a smaller motor than would be required were it not for the described overcenter spring action. Motor assembly 96 is secured to master cylinder 12 by passing the studs 76 of the master cylinder flange through suitable apertures in a flange portion 98a of frame member 98 and then threading nuts 90 onto studs 76. A boot 112 is provided at the open rearward end of the master cylinder to slidably pass push rod 108 but preclude the entry of contaminants into the bore of the master cylinder.

Figure 7:
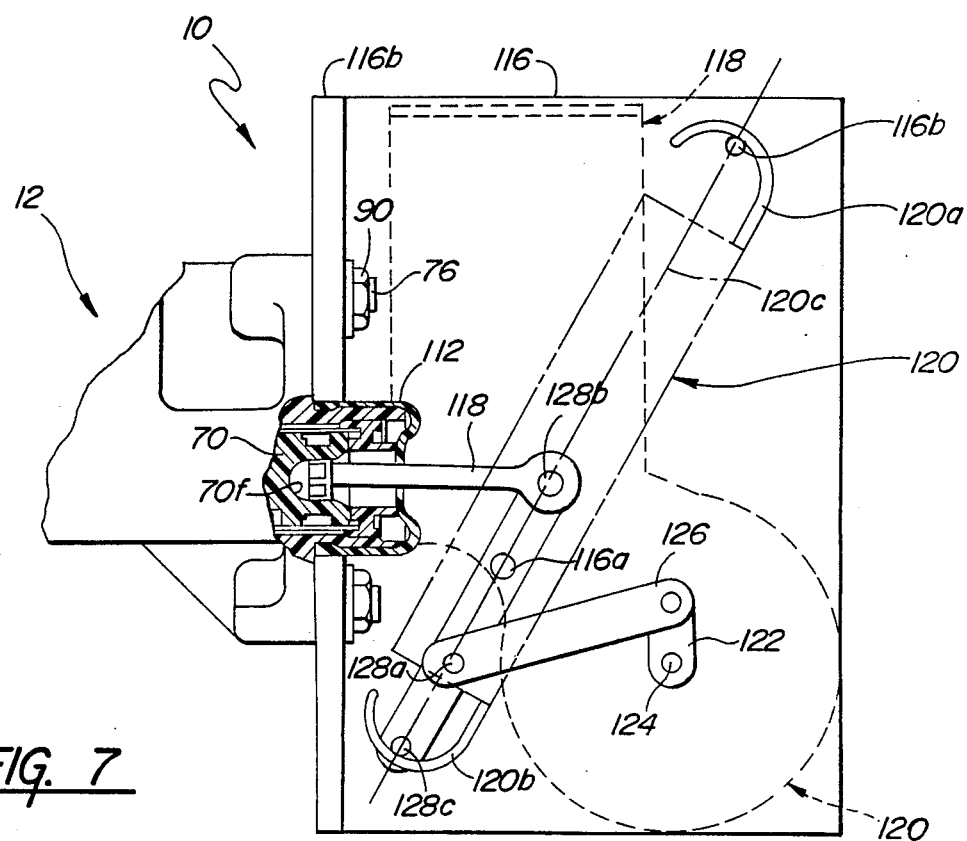
FIG. 7 is a view of a further modified version of the invention master cylinder assembly.

The further modified form of the invention master cylinder assembly seen in FIG. 7 includes a master cylinder 12 and a motor assembly 114. Motor assembly 114 includes a frame member 116; an electric DC gear motor 118 secured to the frame member; a speed reduction unit 120 secured to the frame member and driven from the output shaft of the gear motor; a crank arm 122 secured at its lower end to the output shaft 124 of the gear reduction unit; a link 126 secured at one end to the upper end of crank arm 122, a further link 128 pivotally mounted intermediate its ends on a pin 116b secured to frame member 116; a push rod 118; and an overcenter coil spring 120. The other or free end of link 126 is secured to link 128 at pivot point 128a and push rod 118 is secured to the upper end of link 128 at pivot point 128b with the other or free end of push rod 118 received in the socket 70a of piston 70. Overcenter spring 120 is mounted at one end 120a over a pin 116b carried by frame member 116 and is mounted at its other end 120b over a pin 128c carried on the lower end of link 128. Motor assembly 114 is secured to master cylinder 12 by passing studs 76 through suitable apertures in a flange portion 116b of frame member 116 and threading nuts 90 onto studs 76. In the inactive or unactuated position of the assembly, as seen in FIG. 7, the line of action 120c of spring 120 passes through pivot point 128b so that, as the motor is energized to move the piston linearly to the left, pivot point 128b moves overcenter with respect to the center line 120c of the spring so that the spring thereafter assists the leftward or actuating linear movement of the piston 70 within the bore of the master cylinder.

Figure 8:
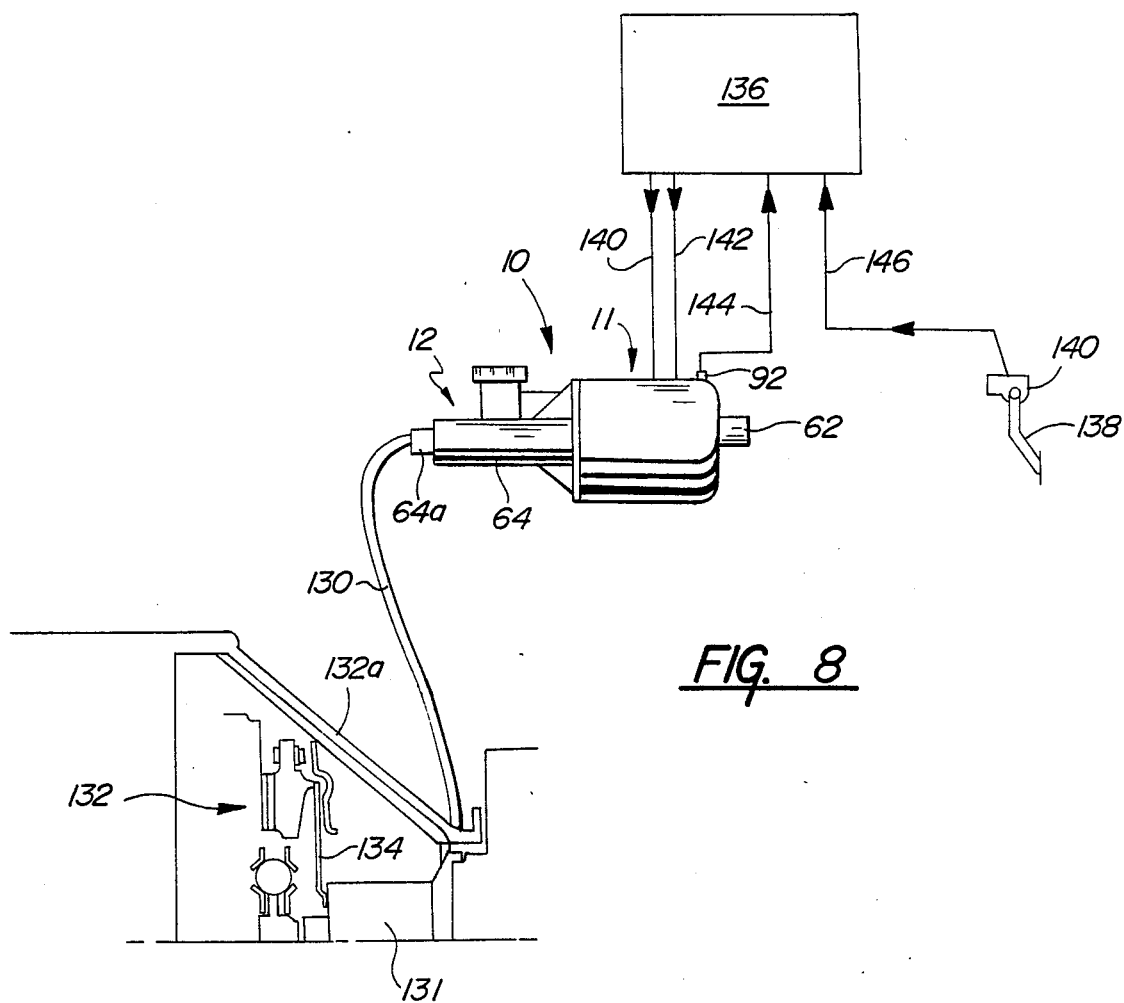
FIG. 8 is a schematic view of a clutch control system employing a master cylinder assembly according to the invention.

The use of a master cylinder assembly 10 of the type seen in FIGS. 1–5 in a clutch control system for a motor vehicle is illustrated in FIG. 8. It will be understood that the modified master cylinder assemblies of FIG. 7 or 8 could also be used in the clutch control system of FIG. 8.

In the use of the invention master cylinder assembly 10 in a motor vehicle clutch control system, the output fitting 64a of the master cylinder main body 64 is connected to a high pressure hydraulic fluid conduit 130 and the other end of conduit 130 is connected to a slave cylinder 131 associated with the clutch 132 of the vehicle. The slave cylinder may be external to the clutch housing 132a or, as shown, may be positioned concentrically and internally within the clutch housing so as to function in known manner in response to receipt of pressurized hydraulic fluid through conduit 130 to actuate clutch release fingers 134 to disengage the clutch of the vehicle. Further details of a concentric slave cylinder of the type illustrated schematically in FIG. 8 are seen, for example, in U.S. Pat. Nos. 4,585,106, 4,585,107, 4,585,108 or 4,585,109, all assigned to the assignee of the present invention.

Master cylinder assembly 10, conduit 130, and slave cylinder 131 are preferably prefilled with hydraulic fluid by the supplier and delivered in their prefilled condition to the motor vehicle manufacturer where they may be readily installed in the motor vehicle in their prefilled condition during the assembly of the motor vehicle. Further details with respect to the construction and advantages of such prefilled hydraulic apparatus are disclosed in U.S. Pat. Nos. 4,407,125 and 4,599,860, both assigned to the assignee of the present invention.

The clutch control system of FIG. 8 further includes an electronic control module 136 and the clutch pedal 138 of the vehicle. Motor leads 140 and 142 interconnect module 136 with motor 11, a further lead 144 interconnects Hall effect sensor 92 with module 136, and a further lead 146 interconnects a switch 140 controlled by clutch pedal 138 with control module 136.

In the operation of the clutch control system of FIG. 8, operator contact with the clutch pedal 138 actuates switch 140 to send a disengage signal to control module 136. Control module 136 functions in known manner to transmit an appropriate signal to motor 11 through leads 140, 142 to energize the motor in a sense to drive the piston of the master cylinder assembly in a clutch disengage direction so as to deliver pressurized fluid through conduit 130 to slave cylinder 131 to move clutch release fingers 134 in a sense to disengage the clutch. Control module 136 also functions to constantly monitor the linear position of piston 70 based on the information provided through lead 144 so as to generate a signal only when the piston is in a position consistent with the signal received from the operator through lead 146. Control module 136 subsequently functions upon release of the clutch pedal by the vehicle operator, as sensed by lead 146, to generate a signal in an opposite sense to the motor 11 so as to enable the motor 11 to retreat linearly and allow the piston to retreat linearly within the master cylinder to its retracted or clutch engage position. Whereas the clutch control system of FIG. 8 is suitable for use in any motor vehicle, its most effective application would be in a large truck-type motor vehicle wherein the described control system would function to substantially reduce the clutch pedal effort required by the operator of the truck.

Figure 9:
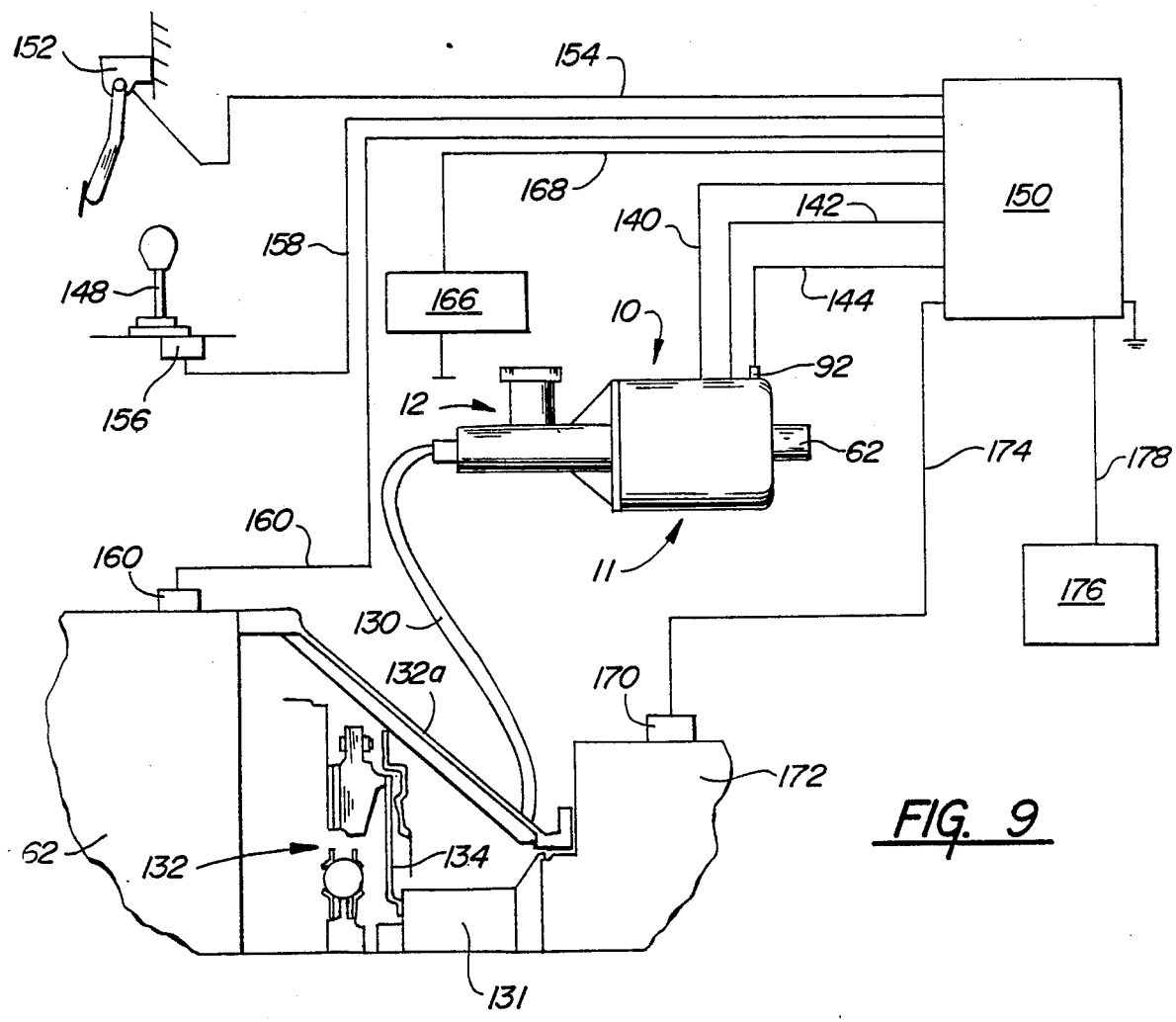
FIG. 9 is a schematic view of a further clutch control system employing a master cylinder assembly according to the invention.

Another clutch control system utilizing a master cylinder assembly according to the invention is illustrated in FIG. 9. In the system of FIG. 9, the clutch pedal is totally eliminated and the clutch is engaged and disengaged in response to a signal generated by movement of the gearshift lever 148. The control system seen in FIG. 9 includes a control module 150; a throttle position sensor 152 connected to module 150 by lead 154; a gearshift lever position sensor 156 connected to module 150 by lead 158; an engine speed sensor 160 associated with engine 162 and connected to module 150 by lead 164; an ignition position sensor 166 connected module 150 by lead 168; leads 140 and 142 connecting motor 11 to the control module; lead 144 connecting position sensor 92 to the control module, a gear box input speed sensor 170 positioned on gear box 172 and connected to module 150 by lead 174; and a road speed sensor 176 connected to module 150 by a lead 178.

The control system of FIG. 9 functions to control the engagement and disengagement of clutch 132 in response to movement of gearshift lever 148 and in dependence on the various signals being provided to module 150 at that time by the various sensors. Specifically, the sensor 92 senses the instantaneous position of the piston in the master cylinder; the throttle position sensor 152 provides position feedback at all times as a voltage proportional to the position of the throttle pedal; the engine speed sensor is a magnetic speed sensor used to determine the RPM of the engine; the gearshift position sensor functions to determine the gear in which the transmission of the vehicle is presently operating; the gear box input speed sensor is used to compare the gear box input speed to the engine speed to determine how much slip is taking place in the clutch; and the road speed sensor is used to provide a safety signal to avoid clutch engagement at such times as such engagement would damage any of the vehicle drive train components. Gear position sensor 156, in addition to providing a signal to control module 150 indicative of the present gear in which the vehicle is operating, also operates to send a clutch disengage signal to the control module in response to very slight movement of gearshift lever 148 so that, assuming that all of the received sensor signals are appropriate, the control module 150 functions in response to slight operator movement of gearshift lever 148 to actuate the motor 11 in a sense to disengage the clutch and functions in response to release of the gearshift lever by the operator to actuate motor 11 in a sense to reengage the clutch. The gearshift lever position sensor 156 is arranged to send a clutch disengage signal to the control module at such time as the driver initially engages the gearshift lever preparatory to making a gearshift and sends a clutch reengage signal to the control module at such time as the gearshift lever arrives at its new, shifted position and the vehicle operator removes all pressure from the gearshift lever.

Figure 10:
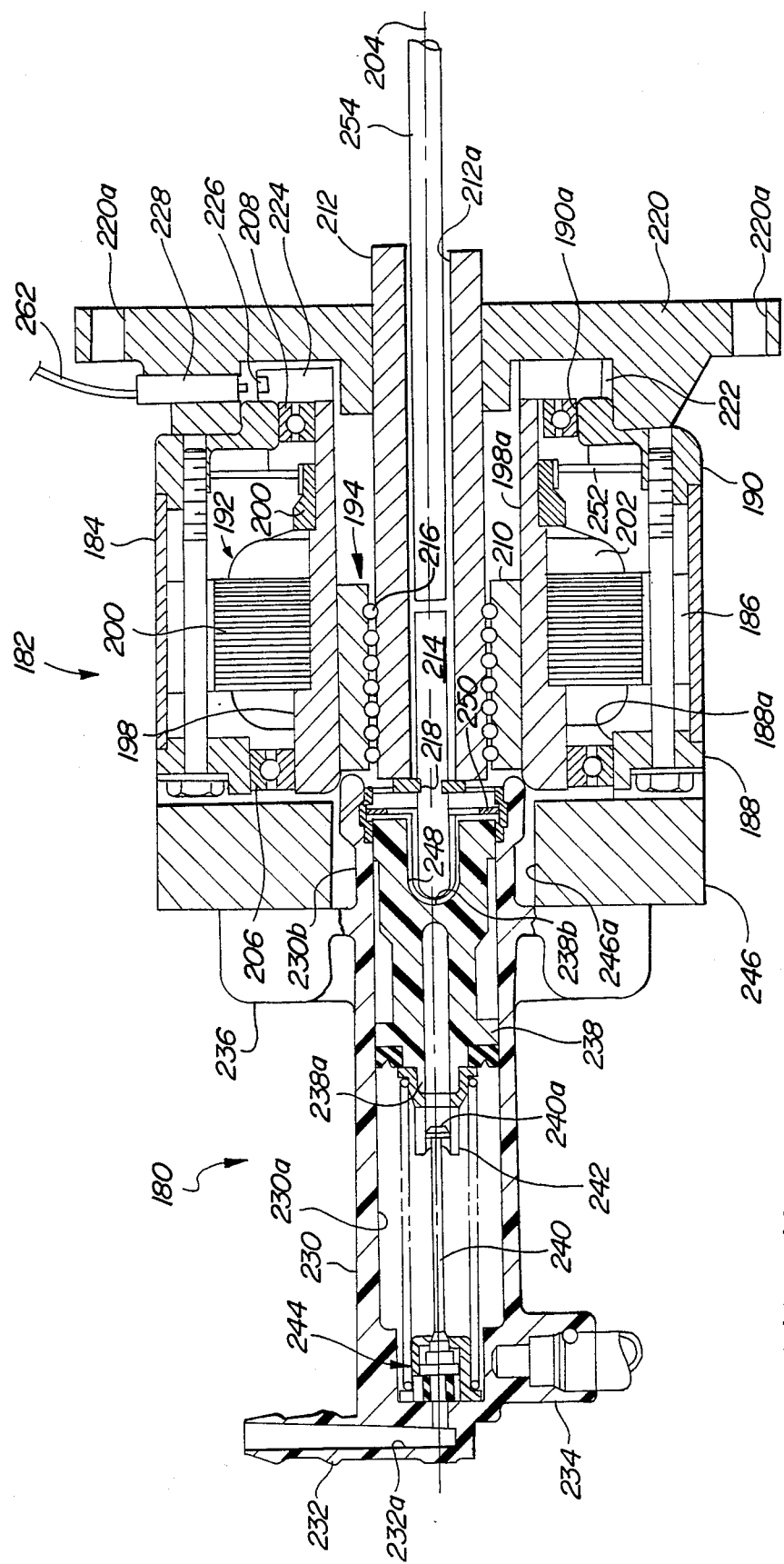
FIG. 10 is a cross-sectional view of a master cylinder assembly according to the invention especially suitable for use in a vehicle braking system.

Another form of master cylinder assembly, especially suitable for use in a vehicle braking system, is illustrated in FIG. 10. The master cylinder assembly 10 of FIG. 10 is similar to the master cylinder assembly of FIGS. 1-5 with the exceptions that the master cylinder 180 is of the center feed type rather than the seal over port type shown in FIGS. 1-5 embodiment; the ball screw mechanism of the motor assembly 182 is positioned totally within the armature of the motor; and the ball screw of the ball screw assembly is hollow so as to allow manual override by a push rod connected to the brake pedal of the vehicle.

Motor assembly 182 includes an annular housing 184, a pair of magnets 186, an annular front end cap 188, a rear end cap 190, an armature assembly 192, and a ball screw assembly 194. Annular housing 184 is clamped between end caps 188 and 190 by tie bolts 196, and magnets 186 are positioned circumferentially within housing 184 with gaps to pass the bolts 196 in the manner shown in FIG. 2. Armature assembly 192 includes a tubular armature 198, a commutator 200 positioned concentrically around armature 198, laminations 200 positioned concentrically around armature 198, and windings 202. The laminations 200 and the windings 202 are interrelated to the armature 198 in the general manner seen in FIG. 2. Armature assembly 192 is mounted within the electric motor housing for rotation about the central axis 204 of the master cylinder assembly by a ball bearing 206 positioned in an annular opening 188a in end cap 188 and by a further ball bearing 208 positioned in an annular opening 190a in end cap 190.

Ball screw assembly 194 includes a ball nut 210, a ball screw 212, and a push rod 214. Ball nut 210 is fixedly secured within the tubular bore 198a of armature 198, generally concentrically within laminations 200, and drives ball screw 212 through a series of bearing balls 216. Ball nut 210 and ball screw 212 may coact to return the balls 216 in the manner seen in FIGS. 3 and 4; that is, the ball screw assembly 194 may, like the ball screw assembly 56 of the FIG. 1 embodiment, be of the internal ball return type wherein, after each turn, the balls are fed back to the preceding turn by a floating liner situated inside the nut.

Ball screw 212 is tubular to define a tubular bore 212a extending from end to end of the ball screw. Push rod 214 is positioned within tubular bore 212a and a snap ring 218 is provided on push rod 214 for pushing engagement by the forward, leading end of ball screw 212.

Motor assembly 182 further includes a firewall mounting plate 220 suitably secured to end cap 190 and defining a cavity 222 between end cap 190 and plate 220. An annular position sensor 224 is secured to the rear annular end of armature 198, is positioned within cavity 222, and includes a plurality of permanent magnet segments 226 which coact with a Hall Effect sensor 228 to provide a means of calibrating the linear position of the ball screw and of the piston of the master cylinder. Mounting plate 220 includes mounting holes 220a for suitably mounting the motor assembly to the firewall of the associated vehicle.

Hydraulic cylinder 180 is of the center feed type and includes a tubular main body member 230 defining an elongated bore 230a, a reservoir inlet fitting 232, an outlet fitting 234, a flange 236, a piston 238, a valve stem 240, a valve stem retainer 242, and a valve assembly 244. Main body 230, reservoir inlet fitting 232, outlet fitting 234, and flange 236 are formed as a single integrally molded plastic member. Piston 238 is also formed of plastic and is slideably received in bore 230a.

Valve stem retainer 242 is secured to the front end or nose 238a of piston 238 and snappingly receives the free rearward end 240a of valve stem 240. The other, forward end of valve stem 240 coacts with valve assembly 244 to establish communication between the inlet passage 232a of inlet fitting 232 and bore 230a with the piston in the retracted position seen in FIG. 10 but to close communication between inlet 232a and bore 230a in response to leftward or actuating movement of the piston linearly within the bore 230a. Further details of the manner in which valve stem retainer 242 coacts with valve stem 240 as well as further details of the manner in which valve assembly 244 operates to open and close communication between reservoir inlet passage 232a and bore 230a in response to linear movement of piston 238 within bore 230a are disclosed in co-pending U.S. patent application Ser. No. 049,133 filed May 12, 1987 and assigned to the assignee of the present invention.

The master cylinder assembly seen in FIG. 10 also includes an adapter plate 246 which includes a central aperture 246a for passage of the forward portion 230b of main body member 230. Adapter plate 246 is suitably secured to and interposed between motor assembly 182 and master cylinder 180 so as to provide a rigid interconnection as between the two assemblies. In the assembled condition of the motor assembly and the master cylinder, the forward end of push rod 214 is received in an annular insert 248 which in turn is received in a socket 238b formed in the rearward end of the piston. Insert 248 is precluded from axial movement within the bore of the master cylinder by a split ring 250 positioned in the open, rear end of the cylinder.

In the operation of the master cylinder assembly of FIG. 10, electric power is suitably delivered to armature assembly 192 through brushes 252 to cause the armature assembly to rotate in known manner. As the armature assembly rotates, ball nut 194 is rotated to move ball screw 212 linearly and thereby correspondingly move piston 238 linearly within bore 230a of the master cylinder. As shown, the hollow tubular construction of ball screw 212 allows a push rod 254, driven by the brake pedal of the motor vehicle, to pass centrally through the ball screw to position the forward end of the push rod immediately adjacent the rearward end of push rod 214 and provide a manual override in the event that the motor assembly 182 fails for any reason to advance push rod 214 in response to the operator's braking signal.

Figure 11:
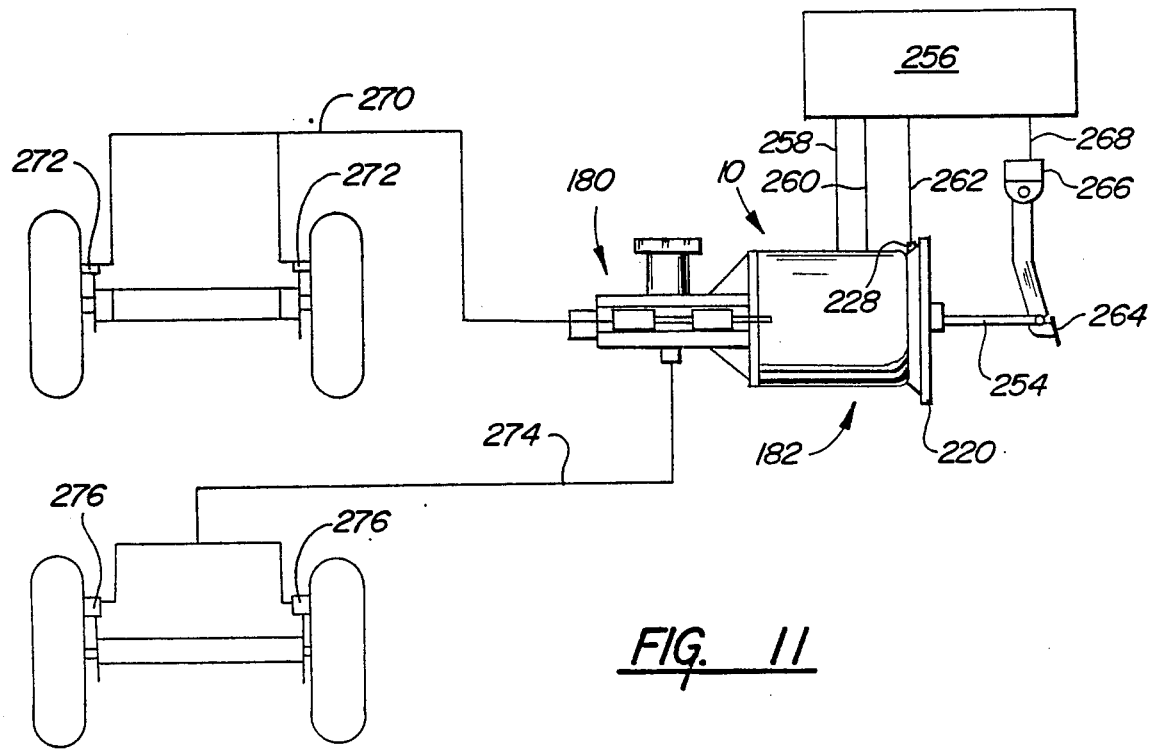
FIG. 11 is a view of a motor vehicle brake control system employing the master cylinder assembly of FIG. 10.

FIG. 11 shows a vehicle braking system employing a master cylinder assembly of the general type seen in FIG. 10. The braking system seen in FIG. 11, in addition to master cylinder assembly 10, includes an electronic control module 256; motor leads 258 and 260 interconnecting the motor assembly and the module 256; a lead 262 interconnecting probe 228 and the control module; a brake pedal 264 directly coupled to push rod 254 received within tubular ball screw 212; a switch 266 sensing movement of the brake pedal by the vehicle operator; a lead 268 interconnecting switch 266 to control module 256; a hydraulic conduit 270 interconnecting one outlet fitting of the master cylinder to the slave cylinders 272 controlling the front brakes of the vehicle; and a further conduit 274 connected to another outlet fitting of the master cylinder and conveying pressure fluid to slave cylinders 276 controlling the rear brakes of the vehicle. As shown schematically in FIG. 11, and in accordance with standard industry practice, the piston of the master cylinder is a tandem piston so as to provide tandem output to the front brake conduit 270 and the rear brake conduit 274.

In the operation of the brake system of FIG. 11, operator movement of pedal 264 actuates switch 266 to signal control module 256 that a braking action is desired whereupon control module energizes motor assembly 182 through leads 258 and 260 to actuate the internal ball screw mechanism of the motor assembly and move the piston linearly within the master cylinder to transmit pressurized hydraulic fluid through lines 270 and 274 to the front and rear brakes respectively of the vehicle. Braking continues for so long as the operator maintains the pedal 264 in an actuated position and is discontinued as soon as the operator foot is removed from the pedal, at which time control module 256 operates to energize motor 182 in a reverse sense to retract the piston of the hydraulic cylinder assembly and release the brakes. In the event of a system failure when the operator calls for a braking action by depression of pedal 264, override push rod 254 moves forwardly to engage the rear end of push rod 214 to move the piston 238 linearly within the bore of the hydraulic cylinder to effect a manual braking action.

Figure 12:
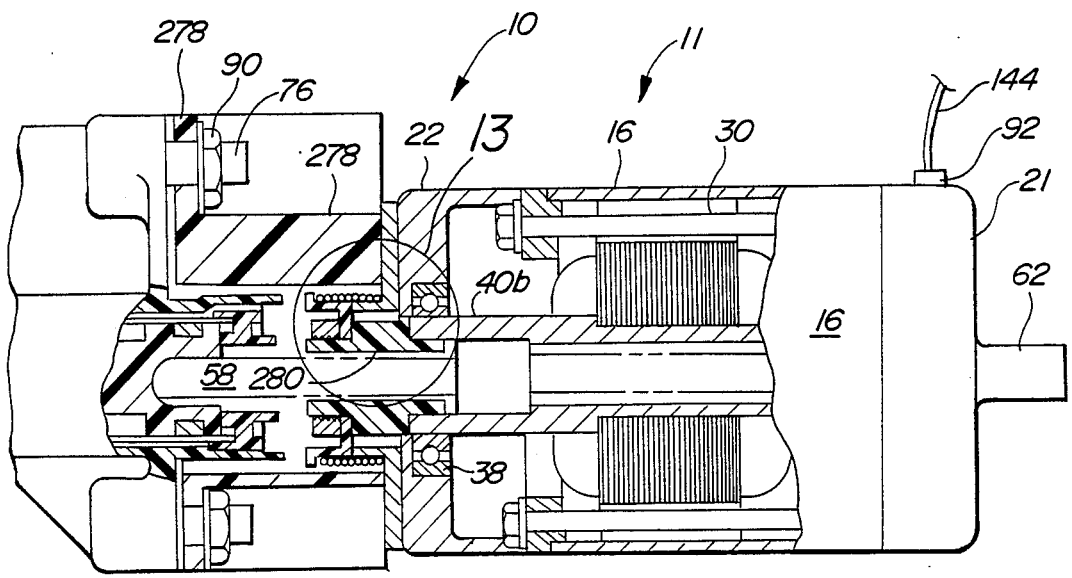
FIG. 12 is a view of a further modified version of the invention master cylinder assembly.
Figure 13:
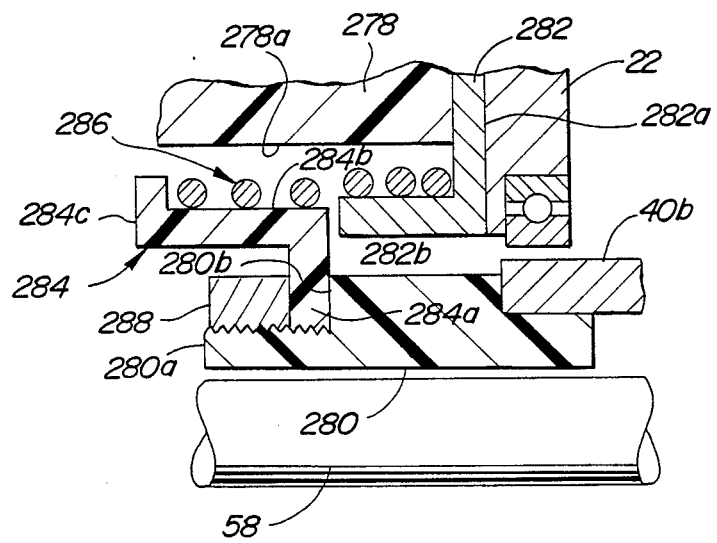
FIG. 13 is a detailed view on an enlarged scale of a portion of the master cylinder assembly of FIG. 12.

The modified version of the invention master cylinder assembly seen in FIGS. 12 and 13 is generally similar to the master cylinder assembly seen in FIGS. 1-5 with the exception that means are provided to prevent inadvertent back driving of the motor.

Specifically, the master cylinder assembly of FIGS. 12 and 13 includes an axially extended adapter plate 278, an annular armature extension 280, an annular fixed plate 282, an annular rotating plate 284, and a coil spring 286.

Armature extension 280 fits fixedly in the open forward end of enlarged armature portion 40b, passes ball screw 58, and defines an externally threaded forward portion 280a.

Fixed plate 282 includes a flange portion 282a clamped between adapter plate 278 and forward auxiliary end cap 22, and a central hollow hub portion 282b extending forwardly from flange portion 282a between armature extension 280 and aperture 278a in adapter plate 278.

Rotating plate 284 is mounted on the threaded forward portion 280a of armature extension 280 by a nut 288. Plate 284 includes an annular radially extending flange portion 284a clamped between nut 288 and a shoulder 280b on armature extension 280 and a hub portion 284b extending forwardly from flange portion 284a and terminating in a radially outwardly extending annular lip 284c.

The outer diameter of rotating plate hub portion 284b is slightly less than the outer diameter of fixed plate hub portion 282b.

Coil spring 286 encircles hub portions 284b and 282b but has a firmer frictional engagement with hub portion 282b than with hub portion 284b by virtue of the diametrical difference, for example 0.050 inches, between the two hub portions.

The spring convolutions are wound in such a way that when the motor is driven in a direction to move the piston to the left as viewed in FIG. 12, the spring expands in diameter and moves away from rotating plate hub portion 284b so that the spring does not interfere with the powered actuating movement of the piston to the left as viewed in FIG. 12. If the piston attempts to move to the right as viewed in FIG. 12 after being moved to the left to its system actuating position, as a result for example of back fluid pressure exerted on the piston by unwanted movement in the associated control system of the vehicle, the retreating movement of the piston will operate through the ball screw assembly to attempt to rotate the armature of the motor. However, as the armature attempts to rotate, spring 286 will contract in diameter thus creating friction between rotating plate hub portion 284b and the spring to prevent backdriving of the motor by inadvertent movement in the associated system of the vehicle.

It will be understood that in most applications the lead of the ball screw assembly in combination with the force exerted on the armature assembly by the permanent magnets will prevent backdriving of the motor so that the spring brake of the master cylinder assembly of FIG. 12 will not be required in most motor vehicle applications. It will be further understood that the extent to which nut 288 is tightened against flange portion 284a of the rotating plate will be varied so as to provide the described spring braking action in the event of inadvertent backdriving of the motor but yet allow slippage to occur between the rotating plate and the armature extension when the motor is purposely energized in a sense to return the piston to its unactuated position.

Figure 14:
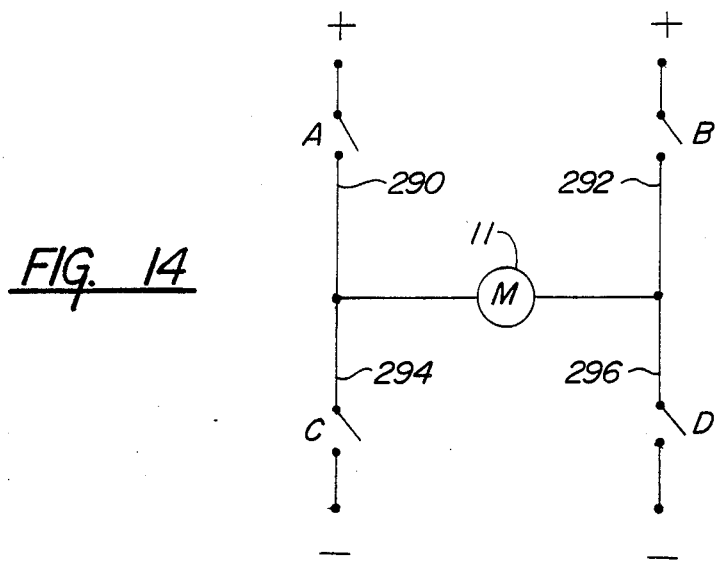
FIG. 14 is a detailed view of a motor control circuit usable in any of the disclosed master cylinder assemblies.

It may also be necessary or desirable in some applications to augment the back EMF of the motor and the resistance provided by the lead of the nut and screw assembly by the use of dynamic braking of the motor. Specifically, as seen in FIG. 14, the motor 11 may be made a part of an H-bridge in which switches A and B are provided in the two positive leads 290 and 292 and further switches C and D are provided in negative leads 294 and 296 of the H-bridge. With this H-bridge arrangement, the motor may be driven in a forward sense by the closing of switches of A and B; may be driven in a backward or rearward sense by the closing of switches B and C; and may be dynamically braked by the closing either of switches A and B or of switches C and D. The switching of the switches A, B, C, and D may be controlled in a known manner by the control module 136 of the control system of FIG. 8, the control module 150 of the control system of FIG. 9, or the control module 256 of the control system of FIG. 11. In each system, the appropriate module will function upon the arrival of the clutch at its fully disengaged or fully engaged position to close either switches A and B or switches C and D to thereby dynamically brake the motor. The dynamic braking action not only serves, with the clutch in its disengaged position, to augment the resistance to back driving provided by the lead of the nut and screw and the back EMF of the motor, but also functions to provide a more rapid and more precise stoppage of the motor at such time as the clutch has arrived at either its fully disengaged or fully engaged position.

The master cylinder assembly of the invention will be seen to provide many important advantages. Specifically, the combination of an electric motor directly coupled to and directly driving the piston of a master cylinder is readily usable in several motor vehicle systems to achieve an efficient and positive actuation of the associated vehicle system such, for example, as a clutch or a braking system. The invention master cylinder assembly operates quickly, positively, and reliably to provide the delivery of pressurized fluid to the associated motor vehicle system. In particular, the invention master cylinder assembly provides a convenient power mechanism for automatically effecting the engagement and disengagement of a motor vehicle clutch in response to an operator induced signal so as to retain the feel and control of a manual shift transmission vehicle while eliminating the labor and effort associated with the engagement and disengagement of the clutch.

Whereas preferred embodiments of the invention has been illustrated and described in detail, it will be apparent that various changes may be made in the disclosed embodiments without departing from the scope or spirit of the invention. For example, although the nut has been spun to linearly advance the screw in the embodiments of the invention master cylinder employing a nut and screw arrangement, it is equally within the scope of the invention to spin the screw and linearly advance the nut.

We claim:

1. An electric motor comprising:
   (a) a housing;
   (b) an annular armature mounted for rotation in said housing;
   (c) a nut positioned within and mounted for rotation with said armature;
   (d) an annular screw positioned within and threadably engaging said nut and defining a central bore;
   (e) a push rod positioned concentrically and slidably within said annular screw bore and projecting out of one end of said screw bore; and
   (f) one way drive means between said push rod and said screw driving said push rod linearly in response to linear movement of said screw in one direction while allowing relative axial movement between said push rod and said screw.

2. An electric motor comprising:
   (a) a housing;
   (b) an annular armature mounted for rotation in said housing;
   (c) a nut positioned within and mounted for rotation with said armature;
   (d) an annular screw positioned within and threadably engaging said nut and defining a central bore extending axially through said screw;
   (e) a first push rod positioned concentrically within said annular screw bore, drivingly connected to said annular screw, and projecting at its outboard end out of one end of said screw bore; and
   (f) a second push rod having its inboard end disposed within said screw bore in juxtaposition to the inboard end of said first push rod and projecting at its outboard end out of the other end of said screw bore.

3. A master cylinder assembly comprising:
   (a) an electric motor including a housing and a hollow armature;
   (b) a hydraulic master cylinder including a housing rigid with said motor housing, a cylinder defining an elongated bore, a piston movable linearly and slidably in said bore, inlet means in said cylinder for admitting hydraulic fluid into said bore from a reservoir, and an outlet fitting in said cylinder communicating with said bore and operative to convey hydraulic fluid out of said bore for delivery to a slave device in response to linear movement of said piston in said bore;
   (c) nut means driven by said armature;
   (d) an annular output shaft defining a bore extending axially therethrough and having a threaded portion threadably engaging said nut means so that rotation of said armature upon energization of said motor linearly advances said output shaft;
   (e) a first push rod drivingly connected at its outboard end to said piston, having its inboard end disposed within said output shaft bore, and drivingly connected to said output shaft so that said piston is moved linearly in response to linear advancement of said output shaft; and
   (f) a second push rod having its inboard end disposed within said output shaft bore in juxtaposition to the inboard end of said first push rod and extending at its outboard end out of the end of said output shaft remote from said master cylinder.

* * * * *